United States Patent
Pagano et al.

(10) Patent No.: US 11,146,312 B2
(45) Date of Patent: Oct. 12, 2021

(54) HIGH RELIABILITY REMOTE RADIO HEAD COMMUNICATION DEVICE

(71) Applicant: Alcatel Lucent USA, Inc., Murray Hill, NJ (US)

(72) Inventors: Carmine Pagano, Blairstown, NJ (US); John Rucki, New Providence, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 551 days.

(21) Appl. No.: 14/582,310

(22) Filed: Dec. 24, 2014

(65) Prior Publication Data
US 2016/0191227 A1 Jun. 30, 2016

(51) Int. Cl.
| | |
|---|---|
| H04L 5/14 | (2006.01) |
| H04W 72/04 | (2009.01) |
| H04B 7/0413 | (2017.01) |
| H04B 1/40 | (2015.01) |
| H04B 1/00 | (2006.01) |
| H01Q 1/24 | (2006.01) |

(52) U.S. Cl.
CPC ............ H04B 7/0413 (2013.01); H04B 1/40 (2013.01); *H01Q 1/246* (2013.01); *H04B 1/005* (2013.01)

(58) Field of Classification Search
CPC .......... H04W 88/085; H04L 5/14; H04B 1/04; H04B 7/0413
See application file for complete search history.

(56) References Cited

U.S. PATENT DOCUMENTS

| | | | | |
|---|---|---|---|---|
| 2010/0271985 | A1* | 10/2010 | Gabriel | H01Q 1/246 370/278 |
| 2012/0046038 | A1* | 2/2012 | Gao | H04W 28/16 455/447 |
| 2014/0072064 | A1* | 3/2014 | Lemson | H04B 10/25753 375/267 |
| 2014/0139395 | A1* | 5/2014 | Solondz | H01Q 1/246 343/872 |
| 2014/0171063 | A1* | 6/2014 | Mori | H04W 52/20 455/424 |
| 2016/0183275 | A1* | 6/2016 | Inoue | H04B 7/0695 455/450 |
| 2017/0026889 | A1* | 1/2017 | Tsuda | H04W 52/0206 |

* cited by examiner

*Primary Examiner* — Romani Ohri
(74) *Attorney, Agent, or Firm* — Harness, Dickey & Pierce, P.L.C.

(57) ABSTRACT

Example embodiments relate to a communication system including an antenna and a plurality of multi-band remote radio heads operationally coupled to the antenna. The remote radio heads are configured to support transmission and reception at two or more frequency bands. Example embodiments relate to a communication system including an antenna and a plurality of multi-band remote radio heads operationally coupled to the antenna, each multi-band remote radio head including a plurality of multi-band duplexers.

20 Claims, 3 Drawing Sheets

HIGH RELIABILITY REMOTE RADIO HEAD COMMUNICATION DEVICE

BACKGROUND

1. Field of Invention

Example embodiments relate to methods and/or systems for improving reliability of remote radio head communication devices. More particularly, example embodiments relate to a plurality of remote radio heads being configured to support transmission and reception at two or more frequency bands.

2. Description of Related Art

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNodeBs may have all functionality associated with conventional, well-known base stations in addition to the capability and functionality to perform the methods discussed herein. An eNodeB typically includes a remote radio head (RRH) together with an antenna, the eNodeB being configured to receive a signal, and possibly an interference mitigation block configured to selectively pass and amplify the signal. An example of a typical dual-band, 4×4 multiple-input multiple-output (MIMO) cellular network using a 4-port, dual-polarized antenna is shown in FIG. 1. In FIG. 1, two band-specific (single-band) 4 Transmit/4 Receive (4T/4R) remote radio heads 140 and 150 are connected to the antenna 110 through 4 dual-band diplexers 120 configured to transmit and receive radio-frequency (RF) traffic signal associated with the eight RF ports of the two 4×4 remote radio heads 140 and 150. The dual-band diplexers 120 may typically be integrated into the antennas or may be stand-alone entities near the remote radio heads 140 and 150 and the antenna 110. In addition, twelve high-power RF cable jumpers 130 interconnect the remote radio heads 140 and 150, the dual-band diplexers 120 and the antenna 110, which constitute the three main assemblies of the cellular communication site. As shown in FIG. 1, each of the single-band remote radio heads 140 and 150 consists of four duplexer filters, four power amplifiers (PAs), four low-noise amplifiers (LNAs), and a 4T/4R radio emitting in a particular frequency band. Power conversion circuits used to take the external voltage to voltages standard, for example for the internal circuits, are not illustrated. Typically, the radio and RF circuits are designed for efficient operation at one band of frequencies designated by the 3GPP (third generation partnership project) standards, and remote radio heads products are predominantly single-band products.

As illustrated in FIG. 1, the 4-port antenna 110, commonly used in base-stations, generally consists of two, dual polarized (+45° and −45°) vertical antenna arrays. The vertical array provides a radiation pattern which focuses the RF power into a narrow horizontal lobe. The antenna elements are wide-band elements allowing transmission and reception of signals from many different frequency bands. Each of the 4 ports on the antenna 110 is bi-directional, accepting high-power RF carriers transmitted by the remote radio heads 140 and 150 as input, and sending the received carriers from the mobiles or user equipment (UE) intercepted by the antenna 110 as output. The filters of the 4 dual-band diplexers 120 contain filtering circuits that consolidate the RF signals from the two remote radio heads 140 and 150, serving different frequency bands, into one port that can be connected to the antenna 110. Filters within the diplexers 120 pass signals of a specific frequency to the appropriate nodes on each remote radio heads 140 and 150. The system illustrated in FIG. 1 can also be generalized to cover more than 2 frequency bands. For example, a 3-band network may consist of 3 single band 4T/4R remote radio heads, and tri-plexers that would consolidate the 12 ports (4 ports on each remote radio head) of the remote radio heads to 4 ports to match with the 4 available antenna ports. A 4-band network would use four 4T/4R, single-band remote radio heads and quad-band quadri-plexers, and so forth.

SUMMARY

In order to provide service in different 3GPP frequency bands, multiple, single-band remote radio heads are typically deployed in the cell site installation of a cellular service provider. Accordingly, if one of the remote radio heads fails, service in the band serviced by the failing remote radio head is typically lost.

As such, it would be advantageous to supply two or more 3GPP frequency bands in a single product to reduce site leasing costs and increase capacity and coverage of their cellular networks. Such a product, according to at least one example embodiment, would improve the availability of remote radio heads for all or a plurality of bands and avoid single point failures that could contemporaneously deactivate multiple service bands. An added benefit of such a product is the simplification of the wiring to implement a 4×4 MIMO cell site configuration when using two or more single-band remote radio heads. The simplified connectivity further enhances reliability of the system since RF jumper cables and RF connectors, exposed to the elements, are typically major contributors to cell site performance problems.

At least one example embodiment may allow services to be maintained in all service bands if a remote radio head fails. An example embodiment may rely on the use of two or more multiple-band 2T/2R (two transmit/2 receive) Multiple-Input-Multiple-Output (MIMO) remote radio heads in order for each remote radio head to provide service on two or more frequency bands. When two of the 2T/2R multiple-band remote radio heads are used with a common 4-port antenna, a 4×4 MIMO network is thus formed. Accordingly, if one of the two multiple-band 2T/2R remote radio heads experiences temporary or permanent failure, the network can continue to operate on all frequency bands as a 2×2 MIMO network. Accordingly, the cellular site may avoid experiencing catastrophic failure and may avoid requiring immediate emergency repair. Although the cellular site may eventually require a service crew to replace the faulty remote radio head, performing the repair under undue pressure may be avoided because coverage remains provided in all bands, even if the coverage is provided at reduced MIMO capability because of lower data throughput. Thus, any loss of service due to the failure of a remote radio head may be avoided or prevented.

In light of the above, at least one example embodiment relates to systems and/or methods for improving reliability of remote radio head communication devices, wherein a plurality of remote radio heads are configured to support transmission and reception at two or more frequency bands and are located in a same housing. Some example embodiments also relate to a communication system including an antenna and a plurality of dual-band remote radio heads operationally coupled to the antenna, the plurality of remote radio heads being configured to support transmission and reception at two or more frequency bands.

According to at least one example embodiment, one or more of the plurality of remote radio heads includes at least two dual-band duplexers.

According to at least one example embodiment, each of the remote radio heads includes two power amplifiers for each of the two or more frequency bands, and two low-noise amplifiers for each of the two or more frequency bands.

According to at least one example embodiment, the antenna includes a plurality of dual polarized antennas, each dual-polarized antenna being coupled to a corresponding remote radio head.

According to at least one example embodiment, the antenna includes two or more dual-polarized vertical antenna arrays.

According to at least one example embodiment, a communication system includes an antenna and a plurality of dual-band remote radio heads operationally coupled to the antenna, each dual-band remote radio head including a plurality of dual-band duplexers, the plurality of remote radio heads being co-located and configured to support transmission and reception at two or more frequency bands.

According to at least one example embodiment, the plurality of dual-band remote radio heads are not connected to the dual-band diplexers via RF cable jumpers.

BRIEF DESCRIPTION OF THE DRAWINGS

Various example embodiments of the systems and methods will be described in detail, with reference to the following figures, wherein.

DETAILED DESCRIPTION

Figure 1:
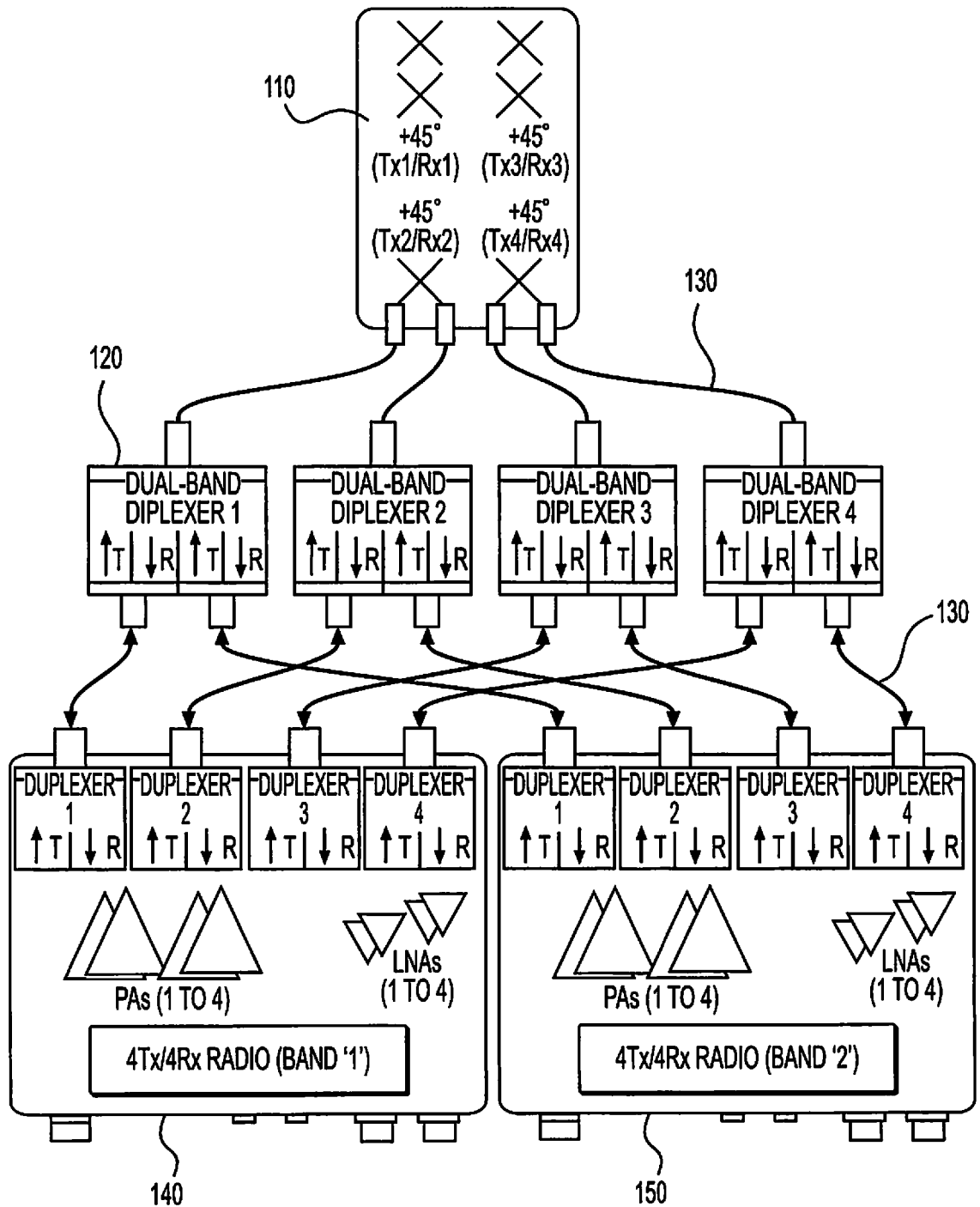
FIG. 1 is a diagram illustrating a conventional cellular site communication apparatus.

These and other features and advantages are described in, or are apparent from, the following detailed description of various example embodiments.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to eNB (or network), whereas downlink (or forward link) transmissions refer to transmissions from eNB (or network) to UE.

According to example embodiments, the Packet Data Network Gateways (PGW), Serving Gateways (SGW), Mobility Management Entities (MME), UEs, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein a MME, PGW and/or SGW may be any well-known gateway or other physical computer hardware system. The MME, PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, PGW, SGW, eNBs, etc.); and to transmit/receive (wireline or wirelessly) controls signals via a control plane or interface to/from other network elements.

The MME, PGW and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more switches, gateways, MMEs, controllers, other eNBs, UEs, etc.

As discussed herein, the PGW, SGW, and MME may be collectively referred to as Evolved Packet Core network elements or entities (or core network elements or entities). The eNB may be referred to as a radio access network (RAN) element or entity.

Reference will now be made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description.

Figure 2:
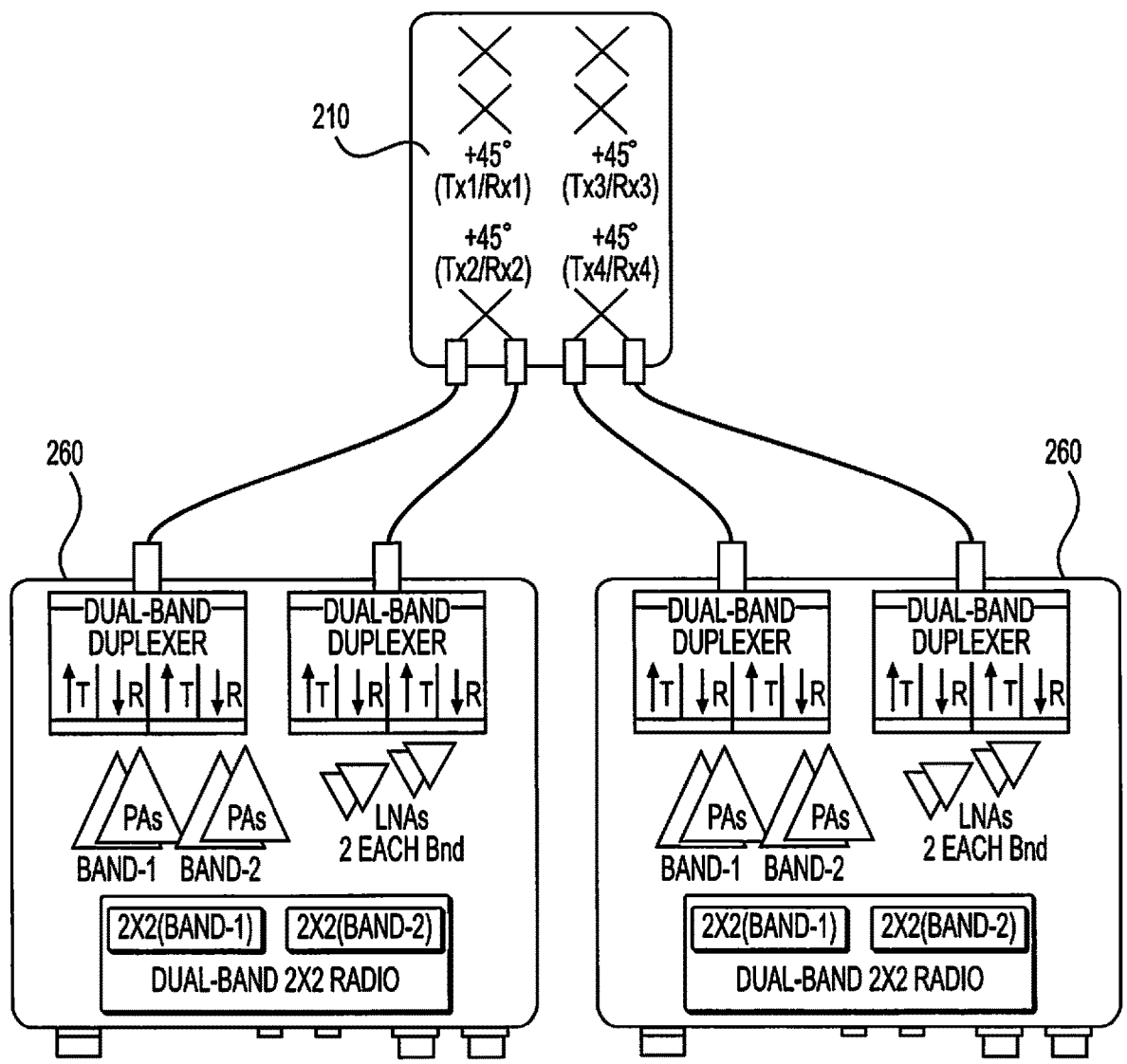
FIG. 2 is a diagram illustrating a cellular site communication apparatus, according to at least one example embodiment.

FIG. 2 is a cellular site communication apparatus according to at least one example embodiment. In FIG. 2, two dual-band 2×2 remote radio heads 260 are directly connected to the 4-port antenna 210. External diplexers and jumper cables are no longer required in the example embodiment illustrated in FIG. 2 because the diplexing function is effectively absorbed into the remote radio heads 260. According to at least one example embodiment, the radio heads 260 have circuits that support transmission and reception at both frequency bands with 2×2 MIMO in each band. Although FIG. 2 illustrates two dual-band 2×2 remote radio heads 260, example embodiments may include more than two remote radio heads 260, each radio head being configured to operate at more than two frequency bands and being connected to a dual-polarized antenna.

The cell site configuration illustrated in FIG. 2, according to at least one example embodiment, is inherently more reliable that the typical configuration illustrated in FIG. 1 because the use of additional hardware such as cables, connectors, and external diplexers, which are typically prone to degradation and failure due to exposure to harsh environmental conditions, is eliminated. In addition, the cell site configuration according to at least one example embodiment allows for 'soft' failure, in that malfunction of one of the two or more remote radio heads 260 does not completely shut down service in any of the two or more bands. If one of the shown Dual-Band 2×2 remote radio head 260 fails, the cellular services continue to operate in both bands as a 2×2 MIMO network, with reduced data throughput to the end user, but no interruption of service occurs. As a result, the service provider can schedule a repair during a regular site visit instead of providing an emergency service dispatch to the site at the time of failure.

According to at least one example embodiment, the dual-band 2×2 remote radio head 260 includes two dual-band duplexers, two power amplifiers (PAs) serving Band '1', two PAs serving Band '2,' two low-noise amplifiers (LNAs) working at Band '1', two LNAs operating at Band '2', and a dual band 2Tx/2Rx radio. According to example embodiments, when the remote radio heads 260 have more than two frequency bands, the remote radio heads 260 may have two multi-band duplexers (e.g., combined single-band duplexers), two PAs serving each of the frequency bands, two LNA's working at each of the frequency bands, and a radio supporting each of the frequency bands.

According to at least one example embodiment, tri-band, quadri-band and higher 4×4 MIMO networks can also be designed by using two 2×2 tri-band, 2×2 quadri-band, or higher band count remote radio heads. Accordingly, if one of the 2T/2R multiple-band remote radio heads fails, 2×2 MIMO service in all frequency bands is maintained. For example, the antenna may be a four-port antenna for a 4×4 MIMO system configuration, a six-port antenna for a 6×6 MIMO system configuration with 3 dual-polarized antennas and 3 multi-band remote radio heads, or a higher level "2n×2n" MIMO system configuration with "n" dual-polarized antennas and "n" multi-band remote radio heads.

Figure 3:
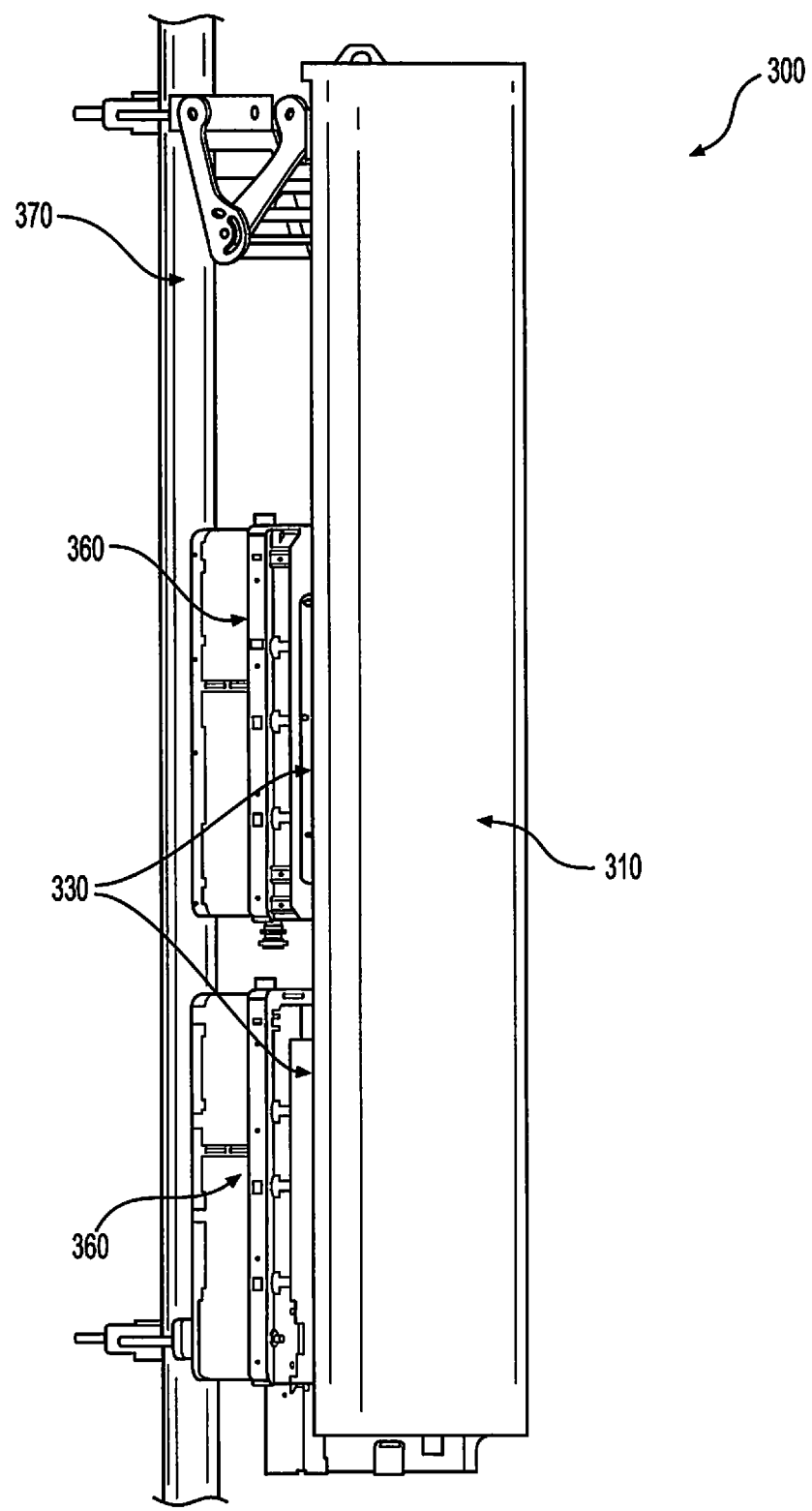
FIG. 3 is an illustration of cellular site communication apparatus in a housing, according to at least one example embodiment.

FIG. 3 is an illustration of a cellular site communication apparatus, according to at least one example embodiment. In FIG. 3, the apparatus 300 includes a tower mounting pole 370, on which two substantially identical multi-band remote radio heads 360 are mounted. According to at least one example embodiment, the remote radio heads 360 are coupled to the antenna 310 via a blind-mate RF interface 330, which provides RF connectivity between the remote radio heads 360 and the antenna 310. According to at least one example embodiment, because the wiring network is simplified, the multi-band remote radio heads 360 can be directly mounted on the antenna 310 using the blind-mate style RF connectors 330. Accordingly, the reliability of the system 300 is improved by eliminating or reducing the need for RF cable jumpers between the remote radio heads 360 and the antenna 310.

While example embodiments have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example embodiments, as set forth above, are intended to be illustrative, not limiting. Various changes may be made without departing from the spirit and thereof. Therefore, the example embodiments are intended to embrace all known or later-developed alternatives, modifications, variations, improvements, and/or substantial equivalents.

What is claimed is:

1. A communication system, comprising:
   a multiport antenna including at least one antenna array and a housing, the at least one antenna array being in the housing; and
   a plurality of multi-band remote radio heads being coupled to different sets of ports of the antenna via a radio frequency (RF) interface and being mounted on the housing,
   each of the plurality of multi-band remote radio heads being configured to support transmission and reception at the same two or more frequency bands, and
   the system being able to function as a multiple input multiple output (MIMO) communication system using one of the plurality multi-band remote radio heads and being able to function as the MIMO communication system using the plurality of multi-band remote radio heads.

2. The system of claim 1, wherein one or more of the remote radio heads each comprise at least two multi-band duplexers.

3. The system of claim 2, wherein at least two of the plurality of multi-band remote radio heads comprise:
   two power amplifiers for each of the two or more frequency bands; and
   two low-noise amplifiers for each of the two or more frequency bands.

4. The system of claim 1, wherein the plurality of multi-band remote radio heads comprise 2Tx/2Rx remote radio heads.

5. The system of claim 4, wherein the at least one antenna array comprises a plurality of dual-polarized antenna arrays, each dual-polarized antenna array being coupled to a corresponding one of the 2Tx/2Rx remote radio heads.

6. The system of claim 5, wherein the multiport antenna comprises a four-port antenna for a 4×4 MIMO system configuration.

7. The system of claim 5, wherein the plurality of antenna arrays comprises two dual-polarized vertical antenna arrays.

8. The system of claim 1, wherein the multiport antenna comprises a six-port antenna configured to support a 6×6 MIMO system configuration including three dual-polarized antenna arrays and three multi-band remote radio heads.

9. A communication system, comprising:
   a multiport antenna including at least one antenna array and a housing, the at least one antenna array being in the housing; and
   a plurality of multi-band remote radio heads being coupled to different sets of ports of the antenna via a radio-frequency (RF) interface and being mounted on the housing, each multi-band remote radio head of the plurality of multi-band remote radio heads including a plurality of multi-band duplexers, and
   the plurality of multi-band remote radio heads being co-located and each of the plurality of multi-band remote radio heads being configured to support transmission and reception at the same two or more frequency bands,
   the system being able to function as a multiple input multiple output (MIMO) communication system using one of the plurality of multi-band remote radio heads and being able to function as the MIMO communication system using the plurality of multi-band remote radio heads.

10. The communication system of claim 9, wherein each of the plurality of multi-band duplexers comprises a combination of single-band duplexers.

11. The communication system of claim 9, wherein the plurality of multi-band remote radio heads are configured to operate independently of multi-band diplexers and radio-frequency connectors.

12. The communication system of claim 9, wherein the plurality of multi-band remote radio heads are co-located with the multiport antenna.

13. A method, comprising:
    providing a multiport antenna including at least one antenna array and a housing in a communications system, the at least one antenna array being in the housing;
    coupling a plurality of multi-band remote radio heads to different sets of ports of the antenna via a radio-frequency (RF) interface; and
    mounting the plurality of multi-band remote radio heads to the housing of the multiport antenna,
    each of the plurality of multi-band remote radio heads being configured to support transmission and reception at the same two or more frequency bands,
    the system being able to function as a multiple input multiple output (MIMO) communication system using one of the plurality of multi-band remote radio heads and being able to function as the MIMO communication system using the plurality of multi-band remote radio heads.

14. The method of claim 13, wherein:
    each multi-band remote radio head of the plurality of multi-band remote radio heads includes a plurality of multi-band duplexers.

15. The method of claim 14, wherein at least two of the plurality of multi-band remote radio heads each comprise:
    two power amplifiers for each of the two or more frequency bands; and
    two low-noise amplifiers for each of the two or more frequency bands.

16. The method of claim 13, wherein the plurality of multi-band remote radio heads comprise 2Tx/2Rx remote radio heads.

17. The method of claim 16, wherein the at least one antenna array comprises a plurality of dual-polarized antenna arrays, each dual-polarized antenna array being coupled to a corresponding one of the 2Tx/2Rx remote radio heads.

18. The method of claim 17, wherein the multiport antenna is a four-port antenna configured to support 4×4 MIMO service.

19. The method of claim 17, wherein the plurality of dual-polarized antenna arrays comprises two dual-polarized vertical antenna arrays.

20. The method of claim 13, wherein the antenna comprises a six-port antenna configured to support 6×6 MIMO service, and further comprises three dual-polarized antenna arrays and three multi-band remote radio heads.

* * * * *